(12) United States Patent
Rogov et al.

(10) Patent No.: US 8,361,362 B2
(45) Date of Patent: Jan. 29, 2013

(54) METHOD FOR PRODUCING EXPANDING STYRENE POLYMER GRANULES

(75) Inventors: Maxim Nikolaevich Rogov, Salavat (RU); Halyl Halafovich Rahimov, Salavat (RU); Marat Hafisovich Ishmijarov, Salavat (RU); Sergei Ivanovich Mjachin, Salavat (RU); Alexej Vladimirovich Prokopenko, Salavat (RU); Alexandr Alexeevich Krasheninnikov, St. Petersburg (RU); Irina Vladimirovna Mjasitsheva, St. Petersburg (RU); Leonid Isaakovich Ginzburg, Duesseldorf (DE); Eugenia Michailova Tarkova, St. Petersburg (RU)

(73) Assignee: Sulzer Chemtech Ltd., Winteathur (CH)

( * ) Notice: Subject to any disclaimer, the term of this patent is extended or adjusted under 35 U.S.C. 154(b) by 940 days.

(21) Appl. No.: 11/884,688

(22) PCT Filed: Feb. 15, 2006

(86) PCT No.: PCT/RU2006/000075
§ 371 (c)(1),
(2), (4) Date: May 2, 2008

(87) PCT Pub. No.: WO2006/088392
PCT Pub. Date: Aug. 24, 2006

(65) Prior Publication Data
US 2008/0203597 A1    Aug. 28, 2008

(30) Foreign Application Priority Data
Feb. 21, 2005   (RU) ................................ 2005105495

(51) Int. Cl.
*B29D 7/00*    (2006.01)
(52) U.S. Cl. ....... 264/46.1; 264/140; 264/141; 264/142; 264/143; 264/145; 264/45.1; 264/45.9; 264/622; 264/623; 264/45.4; 264/173.12; 264/173.16; 264/176.1; 264/174.1; 264/171.23; 264/171.28; 264/172.18; 264/173.14; 264/173.19
(58) Field of Classification Search ................. 264/46.1, 264/174.1, 171.23, 171.28, 172.18, 173.14, 264/173.19
See application file for complete search history.

(56) References Cited

U.S. PATENT DOCUMENTS

| | | | |
|---|---|---|---|
| 3,817,669 A | * | 6/1974 | Buckner ....................... 425/4 C |
| 5,000,801 A | | 3/1991 | Honkura et al. |
| 5,240,967 A | | 8/1993 | Sonnenberg et al. |
| 5,616,413 A | | 4/1997 | Shinozaki et al. |
| 2001/0010849 A1 | * | 8/2001 | Blizard et al. ............... 428/36.5 |
| 2007/0112082 A1 | * | 5/2007 | Hahn et al. ...................... 521/60 |

FOREIGN PATENT DOCUMENTS

| | | |
|---|---|---|
| DE | 195 48 311 A1 | 6/1997 |
| DE | 196 42 658 A1 | 4/1998 |
| EP | 0 445 847 A2 | 9/1991 |
| EP | 0 668 139 A1 | 8/1995 |
| FR | 2 725 995 | 4/1996 |
| FR | 2 820 427 | 8/2002 |
| GB | 1062307 | 3/1967 |
| JP | 04-091141 | 11/1993 |
| RU | 2 087 486 C1 | 7/1993 |
| RU | 2 151 153 C1 | 6/2000 |
| SU | 1381126 A1 | 3/1988 |
| WO | WO2005056653 | * 6/2005 |

OTHER PUBLICATIONS

Xin Wang, "Sharkskin Mechanism of High-Impact Polystyrene (HIPS) and Rheological Behavior of HIPS/TIO2 Composites", Jan. 21, 2004, p. 803.*

* cited by examiner

*Primary Examiner* — Jeffrey Wollschlager
*Assistant Examiner* — Stella Yi
(74) *Attorney, Agent, or Firm* — Francis C. Hand; Carella, Byrne, et al.

(57) ABSTRACT

A method for supplying molten polymer and expanding agent flows to a mixing area, by dispersing the expanding agent in a polymer melt by a rapid dividing mixing in a first static mixer, holding and intensively dividingly mixing the thus obtained mixture in a second static mixer, cooling the mixture, during mixing, in a third static mixer to an intermediate temperature, cooling the mixture to a granulation temperature, extruding polymer threads and subsequently quenching and granulating them. During processing, a weight ratio between the polymer melt flow $G_p$ and the expanding agent flow $G_{BA}$ ranges from 13.0 to 19.0, a temperature in the first static mixer for rapid dividing mixing is calculated according to formula (I), in the second and third static mixed according to formulas (II) and (III), respectively, wherein $G_{BA\ max.}$ is the quantity of a maximum possible expanding agent flow, $GB_{Bct.}$ is the quantity of the used expanding agent flow at the ratio between the melt flow index and a weight average molecular mass ($M_w$) ranges within of $(0.8\text{-}12.0)\times10^{-5}$. The method of this invention makes it possible to produce polysteren in the form of expanding granules, within a wide range of molecular masses, and a shock-resistant polysterene.

4 Claims, No Drawings

METHOD FOR PRODUCING EXPANDING STYRENE POLYMER GRANULES

BACKGROUND OF THE INVENTION

1. Field of the Invention

This invention relates to polymer chemistry, and in particular to the production of expandable polystyrene (EPS) which contain an expanding agent (EA).

2. Discussion of Related Art

EPS is capable of expansion under the effect of heating. Such heating process results in formation of porous material named polystyrene foam (PSF). PSF features a widespread application in different fields of industry. For example, PSF panels are widely used in construction for the purpose of thermal protection and sound insulation. In addition, PSF is used as all-purpose packaging material including solid wrapping and intricate profile packing for transportation of technical instruments and equipment. PSF can also be used as a shock pad under the rails and for similar applications.

Each application requires certain physical and mechanical properties of PSF. The essential physical and mechanical property is the packed density of the expanded product. Plates which are used as shock pads for the railroad and tram rails must have the packed density of a minimum of 35 kg/m$^3$ or even better, that of a minimum of 45 kg/m$^3$. Panels used in construction have packed density of 25 to 35 kg/m$^3$. PSF packing materials are normally very light demonstrating packed density of 12 to 20 kg/m$^3$. Thus, packed density of the polystyrene foam products, which are manufactured of expandable polystyrene, has the highest priority from the customer's point of view.

PSF can be produced by extrusion. In such cases, polystyrene is melted in the extruder. The EA and other additives are loaded into the hot melt and the foam product is extruded. Such an extrusion method for PSF production is known from European Patent Reference EP 0445847 A2. According to this known method, polystyrene is melted in the melting zone of an extruder. Then an EA, which is selected from the group of freons of different compositions, saturated hydrocarbons with the chain length of $C_2$-$C_3$, carbon dioxide or their mixture, is loaded. The polymer melt is mixed with the EA in the melting zone. Following this step, the mixture is cooled down in the cooling zone and the foam product is extruded. The surface finish of the expanded product from this method is controlled by maintaining the certain range of pressure differential between the inlet of the mixing zone and the extruder bore.

Only special grades of polystyrene having narrow molecular-weight distribution and low melt flow index (MFI g/10 minutes) can be used for production of PSF by the extrusion method. Such stringent requirements to polystyrene are due to the specific character of the extrusion based method of expansion. They limit the foam product line substantially and increase their cost. In particular, the method of extrusion essentially does not allow producing light foam products with packed density of less than 30 kg/m$^3$. Another restriction of the extrusion method is its narrow range of products. For instance, it is possible to manufacture products only in form of film, plates, panels with a maximum thickness of 50 cm, and in sections.

If light foam products of another shape are to be manufactured, another EPS is used, which is produced by granulation polymerization of styrene including wetting out of polymer beads and EA in the polymerization step. Such granulation polymerization based method of EPS production is known, such as from one or more of the following Patent References: JP 491141, U.S. Pat. No. 5,240,967, RU 2087486 C1, FR 2725995 A1, U.S. Pat. No. 5,616,413, DE 19548311 A1, DE 19642658 A1, FR 2820427 A1. This method results in a polymer with a comparatively low molecular weight of less than 200000 and with a melt flow index of the melt of 3 and higher. This expandable suspension polystyrene is suitable for production of foam products of any shape having packed density of 25 kg/m$^3$ and less.

However, the production of plates, or other high density products, using expandable suspension polystyrene is unreasonably costly due to the raw material consumption (EPS) and the energy required for its processing. This is unreasonable, because it is not possible to reach the same quality as that of PSF produced by method of extrusion.

Furthermore, the suspension-based method results in large amounts of effluent water to be treated. The beads of EPS produced by the above suspension-based method are featured by wide particle size distribution. However, the production of foam products uses only EPS beads of certain grain size distribution. This fact requires an additional screen sizing of beads with diameters or grain sizes of over 1.5 mm [see for example Chem.-Ing. Techn., 1996, v68, No. 10, p. 1200] as well as recycling of the end beads and powdery residues. This procedure is hindered because of presence of EA.

Another known method, from U.S. Pat. No. 5,000,801, for the production of beads or grains of EPS with narrow particle size distribution includes mixing the EPS and a nucleation agent. The EPS beads are produced by the suspension-based method and contain 5.9 to 7.5% (by weight) of EA. The nucleation agent is provided by a mixture of citric acid and soda, and is taken in the amount of 0.25 to 0.4 g per 1 kilogram of EPS. EPS beads and nucleation agent are mixed in the mixer and then delivered to the extruder. The polymer is melted. The polymer filaments are extruded under the temperature of between 115° C. and 125° C. and the pressure of 1800 psi to 2000 psi, and under conditions which prevent the expansion. These conditions comprise a water bath with a water temperature of approximately 22° C. (15° C. to 30° C.). In this water bath, the extruded filaments are drawn with the rate which is 1.8 times higher than the extrusion rate. The stretched filaments are cut into the polystyrene beads containing EA.

One significant disadvantage of this method is the use of polystyrene with molecular weight ($M_w$) of less than 200000, or of 90000 to 150000 to be exact, and with the melt flow index of the melt of 4.5 to 5.0. Another disadvantage is that the primary polymer may not contain any additives such as antistatic agents, internal lubricants, which prevent clumping of beads and the like, which limits the application of this method significantly.

The method for production of the expandable polystyrene beads is known from European Patent Reference EP 0668139 A1. According to this method, the polystyrene melt flow and the flow of EA is fed into the mixing zone. The EA is dispersed in the polymer melt by thorough shear mixing in the first static mixer. The mixture prepared as above is held under thorough shear mixing in the second static mixer. This mixture is cooled down under mixing in the third static mixer, to the intermediate temperature and then with after-cooling of the mixture, down to the temperature required for granulation. Polymer filaments are extruded by an extrusion nozzle on their shock cooling and are cut in granulate. According to this method, the polymer melt can be supplied to the static mixer both from the extruder and from the installation for the production of polystyrene by bulk polymerization. Holding the mixture with simultaneous shear mixing enables the diffusion process of the EA in the polymer melt. At the cooling stage, the polymer melt is cooled down to the temperature of approximately 120° C. At that temperature, the pressure falls down to approximately 10 MPa. At the extrusion nozzle, the pressure falls down to 1 MPa. The polymer filaments are extruded into the water bath where a temperature of approximately 10° C. is maintained. This results in the formation of EPS beads with uniform distribution of EA and of equal size.

One disadvantage of this known method is that it is suitable for the subsequent processing of only one type of polymer, such as only polymer with certain narrow molecular-weight distribution, in order to produce EPS.

DETAILED DESCRIPTION OF THE INVENTION

One object of this invention is to process the expandable polystyrene to the expandable polystyrene beads, using a very wide range of grades of polystyrene with a large variety of molecular weight. One object of this invention is to produce polystyrene with an extensive applicability features.

According to this invention, the object is accomplished by the method for production of expandable polystyrene beads. This method includes the supply of polymer melt and expanding agent flows to the mixing zone. The expanding agent is dispersed in the polymer melt under thorough shear mixing in the first static mixer. Then the mixture from the first step is held in the second static mixer with thorough shear mixing. Then, the mixture is cooled down to the intermediate temperature under simultaneous mixing in the third static mixer. Then it is after-cooled down to the temperature required for granulation. Then, the method provides for the extruding of polymer filaments on their shock cooling and subsequent granulation. In doing so, the following conditions are to be maintained:

weight ratio or mass flow ratio between the polymer melt flow $G_p$ and the expanding agent flow $G_{EA}$ lying within the range of 13 to 19.

The temperature in the first static mixer with thorough shear mixing, which is to be calculated according to the equation as follows:

$$\left[200 + 56 \cdot \left(1 - \frac{G_{EAcurrent.}}{G_{EAmax}}\right)\right] °C.$$

the temperature in the second static mixer, which is calculated as follows:

$$\left[175 + 70 \cdot \left(1 - \frac{G_{EAcurrent.}}{G_{EAmax}}\right)\right] °C.$$

the temperature in the third static mixer, which is calculated as follows:

$$\left[150 + 70 \cdot \left(1 - \frac{G_{EAcurrent.}}{G_{EAmax}}\right)\right] °C.$$

where $G_{EAmax}$ is the maximum possible expanding agent flow rate, and $G_{EAcurrent}$ is the flow rate of the expanding agent used.

According to this invention, in this case, the ratio between the melt flow index (MFI) of the polymer melt and its weight-average molecular weight (Mw) is maintained within the range of $(0.8$ to $12.0) \times 10{-5}$.

According to this invention, the supply melt flow can be fed from the degasser of a preferably continuous polymer production plant operating under the mass polymerization method. Alternatively, the polymer can be melted by one or several stand-alone extruder(s) and then the polymer melt can be delivered to the static mixer for mixing.

Polystyrene with molecular weight $M_w$ of 90000 to app. 400000 can be used as polymer. It is also possible to use the rubber-modified impact polystyrene having $M_w$ of the polystyrene matrix of 150000 to 300000. The rubber content, such as polybutadiene, styrene-butadiene block copolymers, in the polymer used according to this invention can amount to 5 to 8% by weight.

According to this invention, saturated hydrocarbons with the chain length of $C_4$-$C_6$ can be used as the EA. Such saturated hydrocarbons include for example butane, isobutane, pentane, isopentane or hexane. Pentane and isopentane, or their compounds, are preferably used as EA.

Different adjusting additives such as thermal and light decomposition stabilizers, fire-retardant additives and flame-proofing initiators, plasticizers or internal lubricants, structure-forming additives, so called nucleators, or colorants can be fed to the mixing zone.

As stabilizers of decomposition resulting from the exposure to thermal and/or light effects, any well-known stabilizers normally applied with polystyrene can be used. Such suitable stabilizers are, for example, pentaerythrital ester β-(3,5-ditretbutyl-4-hydroxyphenyl) of the propionic acid (Irganox 1010 of the Swiss company Ciba Speciality Chem.), 2,4-bis-(4-octylthio)-6-(4-hydroxy-3,5-ditretbutylaniline)-1.3,5-triazene (Irganox 565 of Ciba Speciality Chem.), the compound of tris-(2,4-ditretbutylphenyl) phosphate and of octadecyl-3-(3'.5"-ditretbutyl-4'-hydroxyphenyl) propionate in the ratio of 4:1 (Irganox B-900 of Ciba Speciality Chem.) or their equivalent substances.

As the fire-retardant additives and flame-proofing initiators, the halogenated hydrocarbons, such as tetrabrombisphenol A (BE51 of the American company Great Lakes), or hexabromcyclododecane (SD75 and SD75R of the same manufacturer), or their equivalent substances can be loaded into the mixing zone.

Different types of wax can be applied as plasticizers or internal lubricants.

As structure-forming additives or nucleators, talc, alumina, magnesium hydroxide, hydrocerol (the compound of sodium bicarbonate and citric acid), and suchlike components can be mixed in.

Colorants, preferably fat-soluble and/or phthalocyanine dyes, can be loaded in the form of the polystyrene based concentrates.

The additives or agents are loaded into the mixing zone and are uniformly distributed in the polymer melt together with the EA by thorough shear mixing.

The polymer melt is extruded through the extrusion nozzles. The spinning openings of these extrusion nozzles can have the diameter of 0.7 to 2.0 mm. The diameter of the spinning openings of the extrusion nozzles is preferably adjusted to ensure the production of EPS with a close to spherical shape and with such diameter, which is required for the relevant application purpose of this grade of EPS.

The shock cooling of the polymer filaments is preferably ensured by the extrusion of these polymer filaments into the water bath.

EXAMPLES

Below is a description of examples of embodiments of the method according to this invention. However, the method is not limited to only those examples of embodiment.

Example 1

The hot melt of a general-purpose polystyrene, having the MFI/$M_w$ ratio of $0.8 \cdot 10^{-5}$ (MFI=3.0 g/10 minutes, $M_w$=375000), is fed, under temperature of 210° C. and a supply rate $G_p$=1330 kg/hour, into the cascade of the static mixers, which are arranged in-line and in stages. At the same time, the expanding agent flow is fed into the same cascade with the supply rate $G_{EA}$=70 kg/hour, and talc in the amount of 0.1% by weight is loaded. As the EA pentane is used. The $G_p/G_{EA}$ ratio equals to 19.0, and the maximum possible expanding agent flow rate $G_{EAmax}$ for the cascade is $G_{EAmax}$=98 kg/hour.

The temperature in the first static mixer during the vigorous shear mixing is maintained equal to $$\left[200 + 56 \cdot \left(1 - \frac{G_{EAmoment.}}{G_{EAmax}}\right)\right] \circ C. = 216° C.$$

In the second and in the third mixer, the temperatures are maintained at the level as follows:

$$\left[175 + 70 \cdot \left(1 - \frac{G_{EAmoment.}}{G_{EAmax}}\right)\right] \circ C. = 195° C.$$

in the second static mixer and $$\left[150 + 70 \cdot \left(1 - \frac{G_{EAmoment.}}{G_{EAmax}}\right)\right] \circ C. = 175° C.$$

in the third static mixer.

Following this, the mixture is delivered to the second cooling stage where it is cooled down to the temperature of 120° C.

The polymer filaments are extruded into the water bath through the extrusion nozzle with the spinning openings having the diameter of 0.7 mm to 0.9 mm, and are granulated. The water temperature of the water bath is 10±1° C. As an example, artesian water is suitable for the water bath.

The final beads having the diameter of 0.7 mm to 0.9 mm and the pentane content of 5.0% by weight are transferred to the pre-expansion stage.

When choosing the conditions for the pre-expansion procedure, the governing factor is the packed density range of the expanded product to be ensured.

After the pre-expansion is complete, the beads are allowed to stand for 24 hours under normal conditions.

The hot shaping method, also named thermosintering, can be used to produce specimens of polystyrene foam with the dimensions of (50±2)×(50±2)×(40±2) cm. These specimens were tested to determine the packed density, and the results of this test are given in the table below.

Example 2

The experiment was similar to one described in Example 1. However, polystyrene with the ratio of $MFI/M_w$=1.93·10$^{-5}$ (MFI=5.6 g/10 minutes, $M_w$=290000) was used. Together with pentane, the following additives were added into the polymer melt: 1.0% by weight of hexabromcyclododecane, 0.1% by weight of heat stabilizer Irganox B-900, 0.05% by weight of colorant, and 0.1% by weight of talc. The ratio of $G_p/G_{EA}$ equals to 17.2. The colorant is the phthalocyanine brilliant green.

The temperature values in the static mixers and the test results are given in the table below.

Example 3

The experiment was carried out in the same way as in Example 2, however, the ratio of $MFI/M_w$=2.96·10$^{-5}$ (MFI=7.4 g/10 minutes, $M_w$=250000) was chosen. Besides, the ratio of $G_p/G_{EA}$ was maintained at 14.4. The pentane content in the final EPS amounted to 6.5% by weight.

The temperatures in the static mixers and the test results are specified in the table below.

Example 4

The experiment was carried out in the same way as in Example 2, wherein the expanding agent was chosen to be the compound of pentane and isopentane in the ratio of 7:3. Besides, the polystyrene with the ratio of $MFI/M_w$=4.49·10$^{-5}$ (MFI=9.2 g/10 minutes, $M_w$=205000) was used. The ratio of $G_p/G_{EA}$=13.4 was maintained. The polymer filaments were extruded through the extrusion nozzle with spinning openings having the diameter of 0.9 mm to 1.4 mm. The resulting product contains expanding agent in the amount of 6.9% by weight. Double pre-expansion is permitted when processing.

The temperatures in the static mixers and the test results are specified in the table below.

Example 5

The experiment was carried out in the same way as in Example 2, however general-purpose polystyrene with the ratio of $MFI/M_w$=6.82·10$^{-5}$ (MFI=12.0 g/10 minutes, $M_w$=176000) was used. The ratio of $G_p/G_{EA}$=15.1 was maintained. The polymer filaments were extruded through an extrusion nozzle with spinning openings having the diameter of 0.9 mm to 1.4 mm. The resulting product contains expanding agent in the amount 6.2% of by weight.

The temperatures in the static mixers and the test results are specified in the table below.

Example 6

The experiment was carried out in the same way as in Example 4, however polystyrene with $MFI/M_w$=12.0·10$^5$ (MFI=18.0 g/10 minutes, $M_w$=150000) was used and the ratio of $G_p/G_{EA}$=13.3 was maintained. The resulting product contains expanding agent in the amount of 7.0% by weight.

The temperatures in the static mixers and the test results are specified in the table below.

Example 7

The experiment was carried out in the same way as in Example 4, however polystyrene with $MFI/M_w$=8.75·10$^{-5}$ (MFI=14.0 g/10 minutes, $M_w$=160000) was used. The ratio of $G_p/G_{EA}$=14.4 was maintained. The resulting product contains expanding agent in the amount of 6.5% by weight.

The temperatures in the static mixers and the test results are specified in the table below.

Example 8

The experiment was carried out in the same way as in Example 2, however impact polystyrene with butadiene rubber content of 6.5% by weight was taken. $M_w$ of the polystyrene matrix is 260000. MFI of the polymer amounts to 5.8 g/10 minutes. The ratio of $MFI/M_w$ amounts $MFI/M_w$=2.23·10$^{-5}$. The ratio of $G_p/G_{EA}$=14.4 is maintained. The resulting product contains expanding agent in the amount of 6.5% by weight.

The temperatures in the static mixers and the test results are given in the table below.

TABLE

Conditions during production and the properties of final products

| No. | MFI/$M_w \cdot 10^{-5}$ | $G_p/G_{EA}$ | Temperature, °C, in the static mixers - in the first | in the second | in the third | EA content in the final product, % (by weight) | Grain size | Packed density of the product, kg/m³ |
|---|---|---|---|---|---|---|---|---|
| 1. | 0.80 | 19.0 | 216 | 195 | 175 | 5.0 | 0.7 ... 0.9 | 30 ... 55 |
| 2. | 1.93 | 17.2 | 212 | 190 | 165 | 5.5 | 0.7 ... 0.9 | 25 ... 45 |
| 3. | 2.96 | 14.4 | 204.5 | 181 | 156 | 6.5 | 1.4 ... 2.0 | 15 ... 35 |
| 4. | 4.49 | 13.4 | 201 | 176 | 151 | 6.9 | 0.9 ... 1.4 | 12 ... 25 |
| 5. | 6.82 | 15.1 | 206 | 183 | 158 | 6.2 | 0.9 ... 1.4 | 25 ... 35 |
| 6. | 12.0 | 13.3 | 200 | 175 | 150 | 7.0 | 1.4 ... 2.0 | 15 ... 25 |
| 7. | 8.75 | 14.4 | 204.5 | 181 | 156 | 6.5 | 0.9 ... 1.4 | 16 ... 35 |
| 8. | 2.23 | 14.4 | 204.5 | 181 | 156 | 6.5 | 0.7 ... 0.9 | 25 ... 40 |

As evident from the table, the method according to this invention allows to process both polystyrene having a wide range of molecular weights and melt flow indexes and impact polystyrene in order to produce the expandable product. Also, this method enables the production of final product polystyrene foam having a wide range of packed density depending on the pre-expansion and hot shaping conditions.

INDUSTRIAL APPLICABILITY

This invention can be applied in the chemical industry and in the production of styrene plastics in particular. Another application of this invention is the production of polystyrene foam for construction and thermal protection purposes, as well as the manufacture of packaging materials for different application purposes.

The invention claimed is:

1. A method for production of expandable polystyrene beads comprising the steps of
   supplying a polymer melt flow and an expanding agent flow to a mixing zone,
   dispersing the expanding agent in the polymer melt under simultaneous thorough shear mixing in a first static mixer,
   holding a resulting mixture in a second static mixer with simultaneous thorough shear mixing,
   cooling the mixture in a third static mixer with simultaneous mixing to an intermediate temperature with subsequent cooling of the mixture down to a temperature required for granulation, and
   extruding polymer filaments on a shock cooling and a resulting granulation,
   maintaining a weight ratio between the melt flow Gp and the expanding agent flow $G_{EA}$ within a range of 13 to 19 and a temperature in the first static mixer being $[200+56(1-G_{EAcurrent}/G_{EA\ max})]°$ C.,
   in the second static mixer being $[175+70(1-G_{EAcurrent}/qjG_{EA\ max})]°$ C., and
   in the third static mixer being $[150+70(1-G_{EAcurrent}/G_{EA\ max})]°$ C.
   where $G_{EAmax}$ is a maximum possible expanding agent flow rate, and
   $G_{EAcurrent}$ is a flow rate of the expanding agent and where a second ratio between a melt flow index (MFI) of the polymer melt and a weight-average molecular weight ($M_w$) is maintained within a range of $(0.8$ to $12.0) \times 10^{-5}$.

2. The method according to claim 1, wherein a homopolystyrene is used as styrene polymer.

3. The method according to claim 1, wherein an impact polystyrene is used as styrene polymer.

4. The method according to claim 1 wherein $G_{Eacurrent}$ is 70 kg/hour and $G_{EAmax}$ is 98 kg/hour.

* * * * *